Nov. 22, 1966   G. R. QUASIUS ET AL   3,286,520
CONTROL APPARATUS

Filed June 24, 1963   3 Sheets-Sheet 1

INVENTORS
LEO SPIEGEL
BY   GLENN R. QUASIUS

Roger W. Hensen
ATTORNEY

INVENTORS
LEO SPIEGEL
GLENN R. QUASIUS
BY
ATTORNEY

United States Patent Office 3,286,520
Patented Nov. 22, 1966

3,286,520
CONTROL APPARATUS
Glenn R. Quasius and Leo Spiegel, Clearwater, Fla., assignors to Honeywell Inc., a corporation of Delaware
Filed June 24, 1963, Ser. No. 290,012
3 Claims. (Cl. 73—178)

This invention relates to inertial measurement apparatus and more specifically to apparatus for measuring inertial velocity and inertial acceleration of a craft along a sensitive axis and simultaneously measuring angular displacement and angular velocity of the craft about said sensitive axis.

In general at the present time there are two types of inertial systems. One type of inertial system is the gimbal system in which three accelerometers having their sensitive axes orthogonal are mounted by a plurality of gimbals in a manner to give them three degrees of freedom and signals from at least three gyroscopes are utilized to maintain the accelerometers fixed in inertial space. The second inertial system is a strapped-down system. In the strapped-down system three accelerometers are mounted with their sensitive axes orthogonal these three accelerometers meausre the acceleration along the three axes which are fixed with relation to the craft, and three single axis gyroscopes having their input axes mutually orthogonal and fixed in relation to the craft are utilized to determine the attitude of the craft in space. Thus, through much complicated mathematics or computation the direction in space of the axes along which the accelerations are being measured can be determined and through much additional mathematics these accelerations can be utilized to determine the position of the craft in inertial space.

In the present invention a pendulous integrating gyroscopic accelerometer, which will hereafter be referred to as a PIGA, and a single axis stabilization gyro, which is known as a single axis reference or SAR, are mounted to the frame of the craft so that their sensitive axes are parallel. The PIGA has an output shaft rotatably mounted along its sensitive axis. The amount of rotation of this output shaft is a direct indication of the linear velocity of the instrument along its sensitive axis. The rate of rotation of this output shaft is a direct indication of the linear acceleration of the instrument along its sensitive axis. The SAR has a reference output shaft situated along its sensitive axis. The amount of rotation of the gimbal about the reference output axis of the SAR is indicative of the amount of angular rotation of the frame of the craft, which can be utilized to indicate the attitude of the craft about the axis of the craft parallel to the sensitive axis of the SAR. The rate of rotation of the SAR reference output shaft is an indication of the rate of rotation or angular velocity of the frame of the craft. There are many other inertial instruments which may be used in place of the PIGA and the SAR but these two instruments were chosen for explanational purposes, because of the wide general knowledge of these instruments in the field.

The reference output shaft of the PIGA and the output shaft of the SAR are mechanically connected to an angle pickoff device. This angle pickoff device measures the amount of rotation and the rate of rotation of the shaft of the PIGA with relation to the frame of the craft, the amount of rotation and the rate of rotation of the SAR output shaft with relation to the frame of the craft and the amount of rotation and the rate of rotation of the shaft of the SAR and the output shaft of the PIGA with relation to each other.

Thus, the present invention is capable of measuring attitude of the craft and angular velocity of the frame of the craft about a sensitive axis and simultaneously linear velocity independent of rotation of the frame of the craft and linear acceleration independent of rotation of the frame of the craft along a single axis. This invention provides the great advantage that these signals from the PIGA and the SAR do not have to be applied to a computer to remove the errors due to the effects of rotation of the body of the instrument and rate of rotation of the body of the instrument. This is an important advantage since in general the rotation of the output shaft of an inertial device is measured with respect to the body of the device. When this body is fixedly attached to the frame of a craft and the craft is rotated about the sensitive axis of the inertial device an error is introduced because of the rotation of the reference. Because the angle pickoff device utilized can measure the rotation and rate of rotation of the shafts, and because the external computations previously mentioned do not have to be made, a great improvement of accuracy has been obtained. By fixedly mounting three of the disclosed inertial measuring apparatus so that the sensitive axes thereof are directed along three orthogonal axes a complete strapped-down inertial system is obtained.

Accordingly, it is an object of this invention to provide an improved control apparatus.

It is a further object of this invention to provide improved inertial measurement apparatus.

These and other objects of this invention will become apparent from the following description of a preferred form thereof and the accompanying specification, claims and drawings, of which:

FIGURE 4 is a pictorial view of an inertial strapped-down system.

Figure 1:
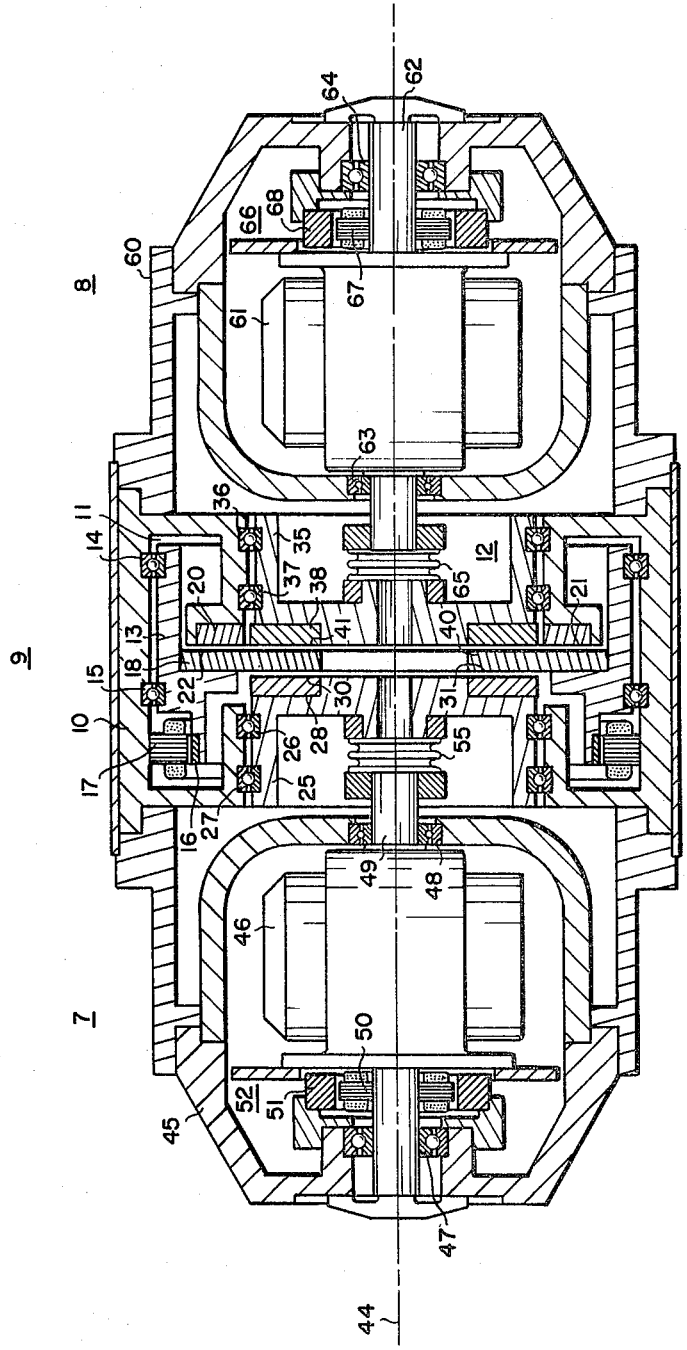
FIGURE 1 is a partial cross sectional view of a single axis inertial measuring apparatus illustrating the relationship of the various components.

FIGURE 1 illustrates a partial sectional view of a single axis inertial measuring apparatus having an inertial instrument 7 on the left for sensing angular velocity relative to the longitudinal axis 44 of the device, an inertial instrument 8 on the right for sensing acceleration relative to the longitudinal axis 44 of the device, and an angle pickoff device 9 in the center mechanically coupled to an output shaft of each of the inertial instruments. In this embodiment the instrument 7 on the left is a single axis stabilization gyro, which is known as a single axis reference or SAR and the instrument 8 on the right is a pendulous integrating gyroscopic accelerometer, which is known as a PIGA.

In FIGURE 1, the numeral 10 designates a hollow cylindrical frame or base means for the angle pickoff device 9, having a "G" shaped cross section, which is symmetrical about the longitudinal axis 44. The inner opening within the frame is designated 11. The central or longitudinal opening is designated 12. A rotor 13 having a generally hollow cylindrical configuration is mounted for rotation about the axis 44 within the inner opening 11 of the frame 10 by means of a pair of ball bearings or the like numbered 14 and 15. It should be understood that for purposes of assembly the frame 10 is constructed in two portions having a junction at which they are matched and connected together by some means such as bolts. In this embodiment rotor 13 has a diameter just large enough to allow it to be supported by bearings 14 and 15 placed between the rotor 13 and frame 10. It should be understood that bearings 14 and 15 may be placed anywhere between the two members as long as they allow axial rotation but prevent substantially any longitudinal or radial movement. Rotor 13 has an extended portion 16 coacting with a wound stator 17 to form means for continuously rotating rotor 13. Stator 17 and rotor 16 may for example form a hysteresis synchronous motor, and stator 17, while not shown in detail, is wound and energized in a manner well known in the art.

A flat disk shaped plate 18 is fixedly attached to rotor 13 by means such as screws or the like, not shown. Plate 18 protrudes through the opening in the "G" shaped cross section of frame 10 into the central or longitudinal opening 12. A flat ring shaped member 20 is fixedly mounted by means such as screws or the like, not shown, to the flat portion of the frame 10 in the opening between the inner opening 11 and the central longitudinal opening 12. Ring 20 and disk 18 are mounted in juxtaposition to provide two spaced apart, parallel surfaces 21 and 22. A small air gap between surface 21 on ring 20 and surface 22 on disk 18 provide sufficient spacing to permit relative rotation between surfaces 21 and 22.

A first generally cylindrical shaped member 25 is rotatably mounted within the longitudinal opening in base means 10 by means of a pair of bearings, which may be ball bearings or the like, 26 and 27. The outer diameter of cylindrical member 25 is slightly smaller than the inner diameter of the cylindrical opening 12 in base means 10. Thus, the bearings 26 and 27 may be placed between the outer surface of cylindrical member 25 and the inner surface of base means 10 to hold the cylindrical member 25 firmly within the cylindrical opening 12 and allow 360 degree rotation about the axis 44.

Fixedly attached to the end of the cylindrically shaped member 25 is a ring shaped member 28. Member 25 is mounted within the longitudinal opening 12 of frame 10 in contiguous relationship to disk 18 so that ring 28 is in juxtaposition with disk shaped member 18. Ring 28 and disk 18 provide a pair of parallel surfaces 30 and 31 respectively having an air gap therebetween to allow relative rotation.

A second cylindrical member 35 having an outer diameter slightly smaller than the inner diameter of the longitudinal opening 12 in base means 10 is mounted for rotation about axis 44 within the longitudinal opening 12 by means of a pair of bearings 36 and 37, which may be ball bearings or the like. Cylindrical member 35 has a ring shaped member 38 mounted on the inner end. Cylindrical member 35 is mounted in contiguous relationship to disk 18 so that ring shaped member 38 is in juxtaposition with disk shaped member 28. Disk shaped member 18 and ring shaped member 38 provide a pair of parallel surfaces 40 and 41, respectively, having an air gap therebetween to allow relative rotation.

The SAR 7 at the left of the angle pickoff device 9 has a generally cylindrical shaped housing 45 fixedly attached to the frame 10 of the angle pickoff device 9. A gyroscopic device 46, not in cross section, has a reference output shaft 49, fixedly attached thereto which is coaxial with the sensitive or input axis of the gyroscopic device 46. Reference output shaft 49, may be attached to the case of the gyroscope 46 in any conventional manner or by making it an integral part of the case. Shaft 49 is coaxial with the longitudinal axis 44 of the device and is mounted within a pair of bearing means 47 and 48 to allow 360 degree rotation of the gyroscopic instrument 46 about the longitudinal axis 44 while preventing substantially any movement along the longitudinal axis 44 or in a radial direction. Gyroscope 46 is not shown in detail since it is a conventional single output axis instrument well known to those skilled in the art such as described in the patent to Jarosh et al., 2,752,791, dated July 3, 1956.

Fixedly attached to the reference output shaft 49 is a wound rotor arrangement 50 which reacts with a hysteresis ring 51, fixedly attached to the fram 45 and in juxtaposition with the wound rotor portion 50 to form a driving means 52 which may be a hysteresis motor. Driving means 52 is utilized to rotate gyroscopic means 46 about its sensitive axis 44. A signal generator contained within the gyroscopic device 46 provides an indication of the off null conditions due to any angular motion about the longitudinal axis 44 of the craft to which the apparatus is mounted. This signal is applied to the wound portion 50 of driving means 52 to rotate the gyroscopic means 46 about its sensitive axis 44 until the rotational input applied thereto is nulled out. Shaft 49 is fixedly attached to rotatable member 25 of the angle pickoff device 9 by means of a coupling device 55. In this embodiment coupling device 55 is shown as flexible coupling which will allow slight longitudinal movement of the two members being coupled to prevent mechanical binding of the various bearing means but will substantially prevent any relative rotation between the two members 25 and 49 about the axis 44. Thus, the rotatable member 25 rotates with the shaft 49 and is an indication of the output of the SAR.

The PIGA on the right side of the angle pickoff device 9 has a cylindrically shaped housing 60 similar to the cylindrically shaped housing 45 of the SAR 7. The cylindrically shaped housing 60 is fixedly attached to the frame 10 of the angle pickoff device 9. A pendulous gyroscopic device 61 has a shaft 62 fixedly attached to the outer case thereof, and in coaxial alignment with the sensitive axis of the PIGA 8. The pendulous gyro 61 is similar to the above referenced Jarosh et al. gyroscope except that the gimbal is purposely weighted or unbalanced so that a linear acceleration along the sensitive axis, which is coaxial with axis 44 in FIGURE 1, will cause a rotation of the gimbal thus producing an output signal from the signal generator. Two sets of bearing means 63 and 64 are mounted on shaft 62 and attached to frame 60 so that shaft 62 is coaxial with axis 44 and the pendulous gyro 61 is supported for 360 degree rotation about axis 44. A driving means 66 comprised of a wound rotor 67 fixedly attached to shaft 62 and a hysteresis ring 68 fixedly attached to frame 60 and mounted in juxtaposition to stator 67 is utilized to rotate pendulous gyro 61 in conformance with any electrical signals received from the signal generator thereof. The shaft 62 of pendulous gyro 61 is connected to the rotatable member 35 of the angle pickoff device 9 by a coupling device 65 which is similar to the coupling device 55. Thus, the rotation of member 35 is directly related to the output of the PIGA 8.

Figure 2:
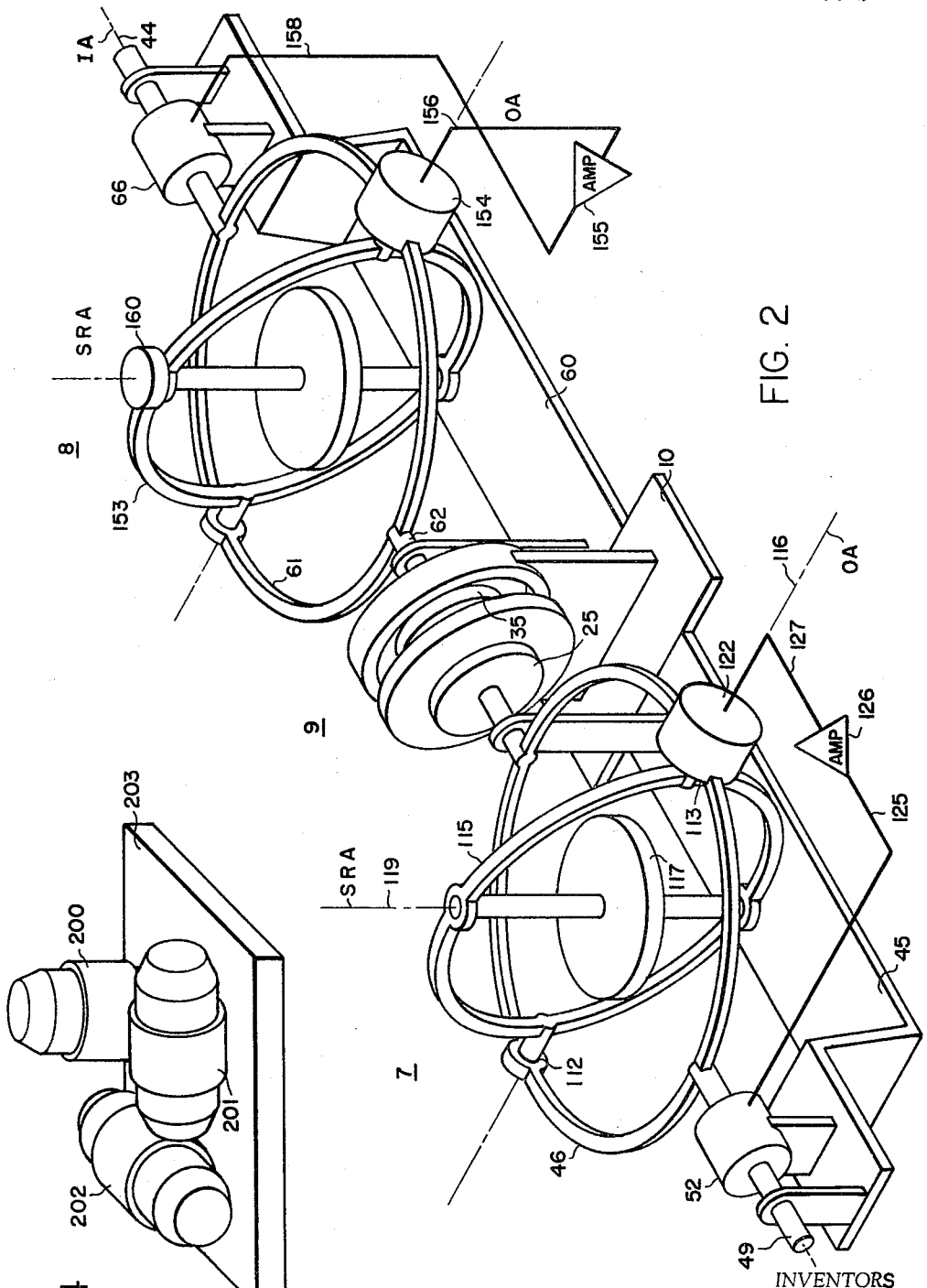
FIGURE 2 is a pictorial mechanical view of a single axis inertial measuring apparatus to more clearly illustrate its operation.

The operating principles of the SAR 7 and the PIGA 8 can be described best with reference to FIGURE 2. The members in FIGURE 2 which correspond to members in FIGURE 1 have been designated with the same numbers to aid in identifying the various members. In the SAR 7, the gyro case per se is equivalent to and is shown as an outer gimbal identified by reference numeral 46 and supports, by a pair of suitable bearing means 112 and 113, an inner gimbal assembly generally identified by reference numeral 115. The gimbal assembly 115 is supported on bearing means 112 and 113 for rotation about an output axis (OA) 116 and an element of the gimbal assembly is a gyro rotor element 117 supported by suitable means and adapted to be spun by suitable means for rotation about a spin reference axis 119 which is perpendicular to the output axis 116. The gyro input axis (IA) identified by reference numeral 49 (which also identifies the reference output shaft of the device) is an axis perpendicular to both the spin reference axis 119 and the output axis 116 and, as is well understood by those skilled in the art, rotation of the entire gyro case 46 about the gyro input or reference output axis 49 will result in precession of the gyro about its output axis 116.

A signal generator means 122 including a rotor element attached to the gimbal assembly 115 and a field element attached to the case 46 provides a means for sensing relative movement therebetween. The signal generator means 122 may be of any suitable type and may be generally of the type shown in the Mueller patent, 2,488,734, issued November 22, 1949.

A drive motor 52 has its rotor connected to the gyro case 46 and its stator connected to the frame 45 of the inertial apparatus which in FIGURE 2 is indicated by a platform. The drive motor 52 is mounted to rotate the entire gyro case 46 about the input axis 49 upon receiving a proper signal on a lead 125. The input lead 125 of the drive motor 52 is connected to the output of an amplifier 126. The output signals from signal generator 122 are connected to the input of amplifier 126 by a lead 127.

Any turning motion of the frame of the inertial measurement apparatus about the input axis 49 acts on the gimbal assembly 115 to cause precessional torque about the gyro output axis 116. The resulting gimbal deflection is detected by the gyro signal generator 122 whose electrical output is amplified by amplifier 126 and applied to the drive motor 52 which drives the gyro case 46 to a position where the signal generator 122 is at a null position. When the signal generator 122 is again providing a zero signal the processional torque on the gimbal assembly 115 produced by the turning motion reacting upon the gyro rotor 117 is again zero and the gyroscope gimbal assembly 115 is aligned in inertial space exactly as it was before the turning motion began. The angle through which the drive motor 52 rotates the gyro case 46 is the inertial apparatus frame rotation or the attitude of the craft. A rotatable member 25 of the angle pickoff device 9 is attached to the input axis 49 of the SAR 7.

The PIGA 8 has gyroscopic apparatus similar to the SAR 7 in that a gyro case 61, equivalent to and shown as an outer gimbal, is mounted, by means of a shaft 62, for rotation about its input axis. An inner gimbal assembly 153 is mounted by appropriate means within the case 61 so that the output axis (OA), the spin reference axis (SRA) and the input axis (IA) are mutually orthogonal and are parallel to the similar axes in the SAR 7. A signal generator means 154 having a rotor connected to the inner gimbal assembly 153 and a field element attached to the case 61 provides a means for sensing relative movement between the inner gimbal assembly 153 and the gyro case 61. The output of the signal generator 154 is applied to an amplifier 155 by means of a lead 156. The output of amplifier 155 is applied to a drive motor 66 by means of a lead 158. Drive motor 66 has its rotor connected to the gyro case 61 and its stator connected to the frame 60 of the PIGA 8. Drive motor 66 rotates case 61 about the input axis which is coaxial with the longitudinal axis 44.

In addition to the gyroscopic apparatus just described a pendulous mass 160 is added to the inner gimbal assembly 153. As shown in FIGURE 2 the pendulous mass 160 is positioned on the gimbal assembly 153 so that its pendulosity vector is aligned with the spin reference axis (SRA). With this arrangement the inner gimbal assembly is affected by accelerations along the acceleration sensitive axis which is parallel with the input axis 44 of the gyro. It will be understood therefore, that the accelerations along the acceleration sensitive axis will react with the pendulous mass 160 to impart a torque to the gimbal assembly 153 tending to rotate the inner gimbal assembly 153 about the output axis (OA). This torque tending to rotate the gimbal assembly about the output axis is known as an inertial reaction torque. The resulting gimbal deflection is detected by the gyro signal generator 154 whose electrical output is amplified by amplifier 155 and applied to the drive motor 66 which drives the gyro case 61 at an angular velocity such that the resulting gyro precession torque exactly rebalances the inertial reaction torque. An increase of applied acceleration causes the gyro gimbal assembly 153 to deflect further, which, in turn, increases the signal generator output; the increased signal to the drive motor 66 causes the gyro case 61 to rotate faster so that the gyro precessional torque is increased to exactly balance the increased inertial reaction torque.

It can be shown that the time integral of acceleration applied to the gyroscope, which is velocity, is proportional to the angular displacement of the gyro case 61 about the input axis 44. It then becomes important to be able to measure accurately the total gyro case rotation relative to the frame 60, which is fixedly attached to the craft upon which the PIGA 8 is mounted, and the case rotation relative to inertial space so as to accurately measure the velocity of the craft. The shaft 62 of the PIGA 8 which mechanically indicates the gyro case rotation is connected to a second rotatable plate 35 of the angle pickoff device 9.

The operation of the angle pickoff device 9 will be explained in conjunction with FIGURE 3. A complete explanation of this device can be found in a copending application by Leo Spiegel, Serial No. 289,628, filed June 21, 1963 and assigned to the same assignee as the present application.

Figure 3:
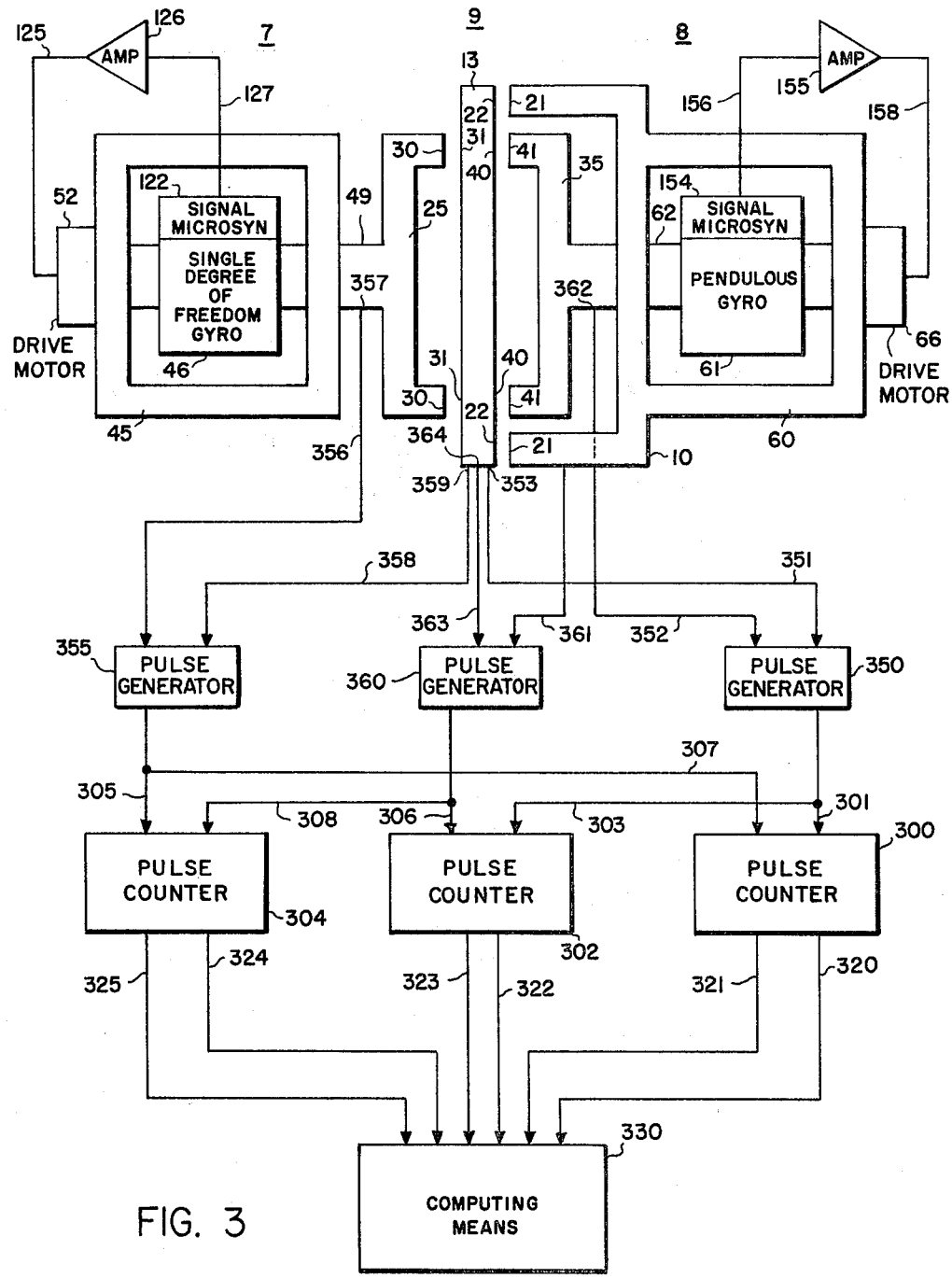
FIGURE 3 is a block diagram of a single axis inertial measuring apparatus.

In FIGURE 3, a block diagram of a single axis inertial measuring device is illustrated. This diagram simply clarifies the electrical connections from the various rotating components and the frame of the device to the electronics of the system. Similar numbers have been utilized in FIGURES 1, 2 and 3 to aid in identifying the various members of the apparatus throughout all of the figures. The portion designated 10 represents the base means or the frame of the angle pickoff device which is shown in detail in FIGURE 1. The portions designated 45 and 60 represent the frames of the SAR and the PIGA respectively. The member designated 13 represents the rotor or the continuously rotating member of the angle pickoff device.

The surfaces 21, 22, 30, 31, 40 and 41 all have cooperative means situated thereon which generally consist of a plurality of line segments situated in a spaced apart relationship about the outer periphery of the surface. The cooperative means may be any means which when properly energized and rotated relative to a similar surface mounted parallel and in juxtaposition thereto provide a pulse each time the segments are axially aligned with similar segments on the adjacent surface. The cooperative means situated on surfaces 22 and 40 are electrically insulated from one another. The cooperative means on surfaces 21 and 22 coact in the manner just described to provide a set of pulses upon proper energization and relative movement therebetween. The cooperative means situated on surface 21 of base means 10 are connected to a pulse generator 360 by means of a lead 361. The cooperative means situated on surface 22 of rotor 13 which coact with the cooperative means on surface 21 to provide electrical pulses are connected to pulse generator 360 by means of a lead 363. Lead 363 receives signals from the rotating element 13 by a connecting means, designated numeral 364.

The member designated 25 represents the rotatably mounted member to which the SAR 7 is connected by means of shaft 49. Surface 30 of member 25 and surface 31 of rotor 13 have cooperative means situated thereon which coact to provide electrical pulses. The cooperative means on surface 30 of member 25 are electrically connected to a pulse generator 355 by means of a lead 356. Lead 356 receives signals from the rotatable member 25 by a connecting means, designated 357. The cooperative means on surface 31 of rotor 13 are connected to pulse generator 355 by means of a lead 358. Lead 358 receives signals from the rotor 13 by a connecting means, designated 359.

The member designated 35 is representative of the second rotatably mounted member in FIGURE 1 which has the PIGA 8 connected thereto by means of shaft 62. The surface 41 on rotatable member 35 and surface 40 on rotor 13 have cooperative means situated thereon which coact to provide electrical pulses. The cooperative means on surface 41 are connected to a pulse generator 350 by means of a lead 352. Lead 352 receives signals from the rotatable member 35 by a connecting means, designated 362. The cooperative means situated on surface 40 are connected to pulse generator 350 by means of a lead 351. Lead 351 receives signals from the rotor 13 by a connecting means, designated 353. It should be noted that the connecting means 353, 357, 359, 362 and 364 may be any means by which an electrical signal can be transmitted from a rotating member to a stationary member an example of which is slip rings and brushes.

Pulse generators 350, 355 and 360 utilize the cooperative means situated on the various pairs of adjacent surfaces 40–41, 30–31, and 21–22 respectively to produce electrical pulses upon relative rotation between the surfaces of an adjacent pair. These electrical pulses are indicative of the amount of relative rotation between the surfaces of a given pair. To provide an accurate indication of the relative rotation between two members such as member 25 and member 35 the pulses from pulse generators 350 and pulse generators 355 are operated upon by additional electronics to compare the movement of member 25 relative to rotor 13 and the movement of member 35 relative to rotor 13.

The signals from pulse generator 350 are connected to a pulse counter circuit 300 by means of a lead 301. The signals from pulse generator 350 are also connected to a pulse counter circuit 302 by a lead 303. The signals from pulse generator 355 are connected to a pulse counter circuit 304 by means of a lead 305. The signals from pulse generator 355 are also connected to pulse counter circuit 300 by means of a lead 307. The signals from pulse generator 360 are connected to pulse counter circuit 302 by means of a lead 306 and to pulse counter circuit 304 by means of a lead 308. The pulse counter circuits contained in blocks 300, 302, and 304 are all similar and are utilized to compare the pulses from the various pulse generators 350, 355 and 360 as well as to interpolate between pulses to provide an extremely accurate digital indication of the relative rotation and rate of rotation between the various members. An example of a pulse generator and pulse counter circuitry which may be used in the angle pickoff device 9, as well as a complete description of the operation thereof, can be found in the above mentioned copending Spiegel application.

The circuit 300 receives pulses from pulse generators 350 and 355 which are indicative of the relative rotation between rotor 13 and member 35, and rotor 13 and member 25. These pulses are operated on to provide an electrical signal on a lead 320 which is indicative of the amount of relative rotation between member 35 and member 25. This electrical signal is a measure of the velocity of the craft along an axis parallel to axis 44. It should be noted that this will be the velocity of the craft without the errors due to the rotation of the strapped-down body of the PIGA 8, since it is being measured with respect to the member 25 which is maintained stationary in space by the SAR 7. The circuit 300 also provides an electrical signal indicative of the rate of rotation between member 35 and member 25 on a lead 321. This electrical signal is a measure of the acceleration of the craft and is also free from errors due to the rotation of the strapped-down body of the PIGA 8. The circuit 302 receives pulses from pulse generators 350 and 360 which are indicative of the relative rotation between rotor 13 and member 35, and rotor 13 and frame 10. These pulses are operated on to provide an electrical signal on a lead 322 which is indicative of the amount of relative rotation between member 35 and frame 10. This electrical signal is a measure of the velocity of the craft along an axis parallel to axis 44, also, but it contains errors due to the rotation of the strapped-down body of the PIGA 8. Circuit 302 also provides an electrical signal on a lead 323 indicative of the rate of rotation between the member 35 and frame 10. This electrical signal is a measure of the acceleration of the craft along an axis parallel to axis 44, and also contains errors due to the rotation of the strapped-down body of the PIGA 8. Since this signal and the signal on lead 322 contain body rotation errors they may be neglected completely in the final computation or they may be utilized for a variety of things such as redundant signals or signals to check the various components in the other circuits. The circuit 304 receives pulses from pulse generators 355 and 360 which are indicative of the relative rotation between rotor 13 and member 25, and rotor 13 and frame 10. These pulses are operated on to provide an electrical signal on a lead 324 which is indicative of the amount of relative rotation between member 25 and frame 10. The electrical signal on lead 324 is a measure of the angular displacement or attitude of the craft about an axis parallel to axis 44. Circuit 304 also provides an electrical signal on a lead 325 indicative of the rate of rotation between member 25 and frame 10. This electrical signal is a measure of the rate of rotation or the angular velocity of the craft about an axis parallel with axis 44.

The leads 320, 321, 322, 323, 324 and 325 are all connected to a computing means 330. Computing means 330 may be any digital, airborne general purpose computer several of which are manufactured by a number of companies. As shown in FIGURE 4, three strapped-down apparatuses 200, 201 and 202, similar to the one shown in FIGURE 1 are mounted on a base 203, by means not shown, so that their sensitive axes are in a mutually orthogonal relationship and their outputs are applied to computing means 330. In FIGURE 4 the base 203 may contain computing means 330. The computing means 330 then utilizes the signals indicative of the velocity and acceleration of the craft along the three orthogonal axes and the angular displacement and angular velocity about the three orthogonal axes to solve preselected mathematical formulas well known to those skilled in the art of inertial guidance. The solution of these mathematical formulas provides information as to the inertial position of the craft in space relative to a set of reference axes, as well as the acceleration and velocity in the desired direction.

Thus, a highly accurate strapped-down inertial system has been disclosed. This system has the additional advantages that it can be made extremely small because the gimbals, servomotors and associated electronics have been eliminated and a great deal of complicated computing apparatus has also been eliminated.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit or scope of this invention.

We claim:
1. Inertial measurement apparatus of the class described comprising:
   (a) a first inertial instrument for sensing acceleration relative to a sensitive axis and having a mechanical output indicative thereof;
   (b) a second inertial instrument for sensing angular velocity relative to a sensitive axis and having a mechanical output indicative thereof;
   (c) means mounting said first and second inertial instruments so that said sensitive axes are substantially parallel;
   (d) pickoff means comprising
       (1) base means having a first surface,
       (2) a plurality of second surfaces,
       (3) cooperative means situated on all of said surfaces,
       (4) energizing means connected to said cooperative means,

(5) means mounting said plurality of second surfaces for rotation each in juxtaposition with respect to another of said surfaces to form a plurality of pairs of surfaces, said cooperative means on one surface of each of said pairs co-acting with said cooperative means on the other surface of each of said pairs upon relative rotation therebetween to provide output pulses, and (6) means for continuously rotating one surface of each of said pairs of surfaces;

(e) means connecting said mechanical outputs of said first and second inertial instruments to said plurality of second surfaces of said pickoff means; and (f) means connected to receive said output pulses from said pickoff means having electrical outputs indicative of the rotation and the rate of rotation of said plurality of second surfaces with respect to each other and with respect to said base means.

2. Inertial measurement apparatus of the class described comprising:

(a) A pendulous gyro accelerometer having a rotatable output shaft the rotation of which is an indication of velocity and the rate of rotation of which is an indication of acceleration of the instrument along a sensitive axis;

(b) a single axis stabilization gyro having a rotatable output shaft the rotation of which is an indication of the angular displacement and the rate of rotation of which is an indication of the angular velocity of the instrument about a sensitive axis;

(c) means mounting said accelerometer and said stabilization gyro so that said sensitive axes are substantially parallel;

(d) pickoff means comprising
 (1) base means having a first surface,
 (2) a plurality of second surfaces,
 (3) cooperative means situated on all of said surfaces,
 (4) energizing means connected to said cooperative means,
 (5) means mounting said plurality of second surfaces for rotation each in juxtaposition with respect to another of said surfaces to form a plurality of pairs of surfaces, said cooperative means on one surface of each of said pairs coacting with said cooperative means on the other surface of each of said pairs upon relative rotation therebetween to provide output pulses, and
 (6) means for continuously rotating one surface of each of said pairs of surfaces;

(e) means connecting said output shafts of said accelerometer and said stabilization gyro to said plurality of second surfaces of said pickoff means; and (f) means connected to receive said output pulses from said pickoff means having electrical outputs indicative of the rotation and the rate of rotation of said plurality of second surfaces with respect to each other and with respect to said base means.

3. An inertial guidance system comprising:
(a) an inertial measurement apparatus disposed along each of three orthogonal axes, each apparatus comprising
 (1) A first inertial instrument for sensing acceleration relative to a sensitive axis and having a mechanical output indicative thereof,
 (2) a second inertial instrument for sensing angular velocity relative to a sensitive axis and having a mechanical output indicative thereof,
 (3) means mounting said first and second inertial instruments so that said sensitive axes are substantially parallel,
 (4) pickoff means comprising
  (a) base means having a first surface,
  (b) a plurality of second surfaces,
  (c) cooperative means situated on all of said surfaces,
  (d) energizing means connected to said cooperative means,
  (e) means mounting said plurality of second surfaces for rotation each in juxtaposition with respect to another of said surfaces to form a plurality of pairs of surfaces, said cooperative means on one surface of each of said pairs coacting with said cooperative means on the other surface of each of said pairs upon relative rotation therebetween to provide output pulses, and
  (f) means for continuously rotating one surface of each of said pairs of surfaces;
 (5) means connecting said mechanical outputs of said first and second inertial instruments to said plurality of second surfaces of said pickoff means; and
 (6) means connected to receive said output pulses from said pickoff means having electrical outputs indicative of the rotation and the rate of rotation of said plurality of second surfaces with respect to each other and with respect to said base means; and
(b) computing means connected to receive the electrical output signals from all three of said inertial measurement apparatus and providing indications of position in inertial space.

References Cited by the Examiner

UNITED STATES PATENTS

| | | | |
|---|---|---|---|
| 2,895,670 | 7/1959 | Newell | 235—150.25 X |
| 2,945,643 | 7/1960 | Slater. | |
| 3,087,333 | 4/1963 | Newell. | |
| 3,164,340 | 1/1965 | Slater et al. | 33—226 X |
| 3,193,216 | 7/1965 | Fischel. | |
| 3,194,948 | 7/1965 | Alexander et al. | |
| 3,214,575 | 10/1965 | Seliger et al. | |

ROBERT B. HULL, *Primary Examiner.*